(No Model.)
G. W. McLAIN.
GATE.
No. 356,692. Patented Jan. 25, 1887.
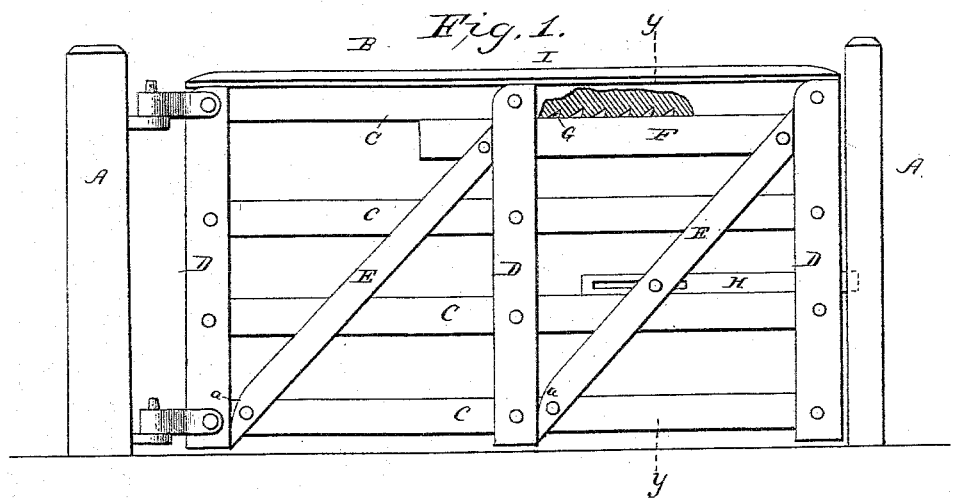
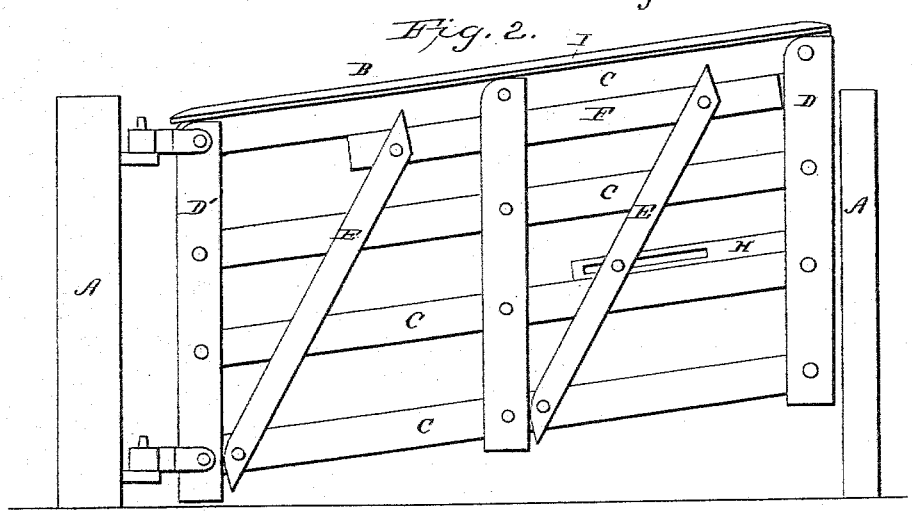
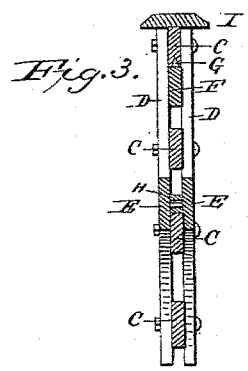
Witnesses
Ch. D. Davis
John S. Finch
Inventor
Geo. H. McLain
By his Attorney
C. W. Alexander

UNITED STATES PATENT OFFICE.

GEORGE W. McLAIN, OF PATASKALA, OHIO.

GATE.

SPECIFICATION forming part of Letters Patent No. 356,692, dated January 25, 1887.

Application filed December 2, 1886. Serial No. 220,461. (No model.)

*To all whom it may concern:*

Be it known that I, GEORGE W. McLAIN, a citizen of the United States, residing at Pataskala, in the county of Licking and State of Ohio, have invented certain new and useful Improvements in Gates, of which the following is a specification, reference being had therein to the accompanying drawings.

My invention has relation to certain new and useful improvements in farm gates; and it relates particularly to that class known as "adjustable swinging gates."

The object of the invention is to provide simple means for adjusting the forward end of the gate with reference to the ground, for the purpose of separating stock, &c.; and it consists in certain novel features of construction that will be fully hereinafter described and claimed.

The invention is fully illustrated in the accompanying drawings, in which—

Figure 1 represents a side elevation of my improved gate, showing the same in a horizontal position; Fig. 2, a side elevation showing the gate in an elevated position; and Fig. 3, a vertical sectional view of the gate, taken on the line $y\,y$ of Fig. 1.

Referring to the annexed drawings by letter, A designates the posts of the gate, and B the gate proper, which is hinged to one of the said posts, and is adapted to swing between them, as is usual.

The gate is constructed of the usual parallel horizontal rails, C, which are pivotally clamped together at their ends and about the middle of their length by means of vertical battens or cleats D. The pivotally securing of the horizontal rails together permits the forward end of the gate to be elevated, as shown in Fig. 2 of the drawings.

Located upon each side of the gate and extending diagonally across the two spaces between the vertical battens D, and pivotally bolted to the bottom rail of the gate, are the adjusting-bars E, which have their ends cut on a bevel, as shown, so as to rest snugly against the edges of the vertical battens when the gate is in a horizontal position and serve to support and retain it in that position. The upper corners of the lower ends of the said bars E are rounded off, as shown at $a$, in order to clear the battens when the gate is elevated, as shown in Fig. 2 of the drawings.

Situated between the two upper rails of the gate and pivotally secured by bolts between the upper ends of the adjusting-bars E is a horizontal locking-bar, F, which, by reason of the pivotal connection of the bars E to the gate, has a vertical and lateral play between the said upper bars of the gate, as is evident. Upon its upper edge the said bar F is provided with a pin or lug, G, which engages with a series of apertures in the lower edge of the upper rail, and by that means holds the gate in any desired position.

Between the horizontal rails of the gate the latch-bar H is adjustably secured by means of a pin passing through two of the bars E and through a slot in the rear end of the said latch-bar. Upon the upper rail and extending from one end of the gate to the other is a cap, I, which serves to protect the working parts of the gate by shedding rain, &c. It will be seen that in whatever position the gate is the bars E and F will serve as a substantial support therefor, and by means of the pin upon the upper edge of the bar E the gate will be held in any desired position.

I am aware that it is not new to construct swinging gates of parallel bars pivotally secured together by vertical battens, and to secure to such gates pivoted diagonal adjusting-bars adapted to engage serrations or serrated plates on the said vertical battens and horizontal bars of the gates, for the purpose of adjusting the same; hence I do not claim such construction broadly.

Having thus fully described my invention, what I claim, and desire to secure by Letters Patent, is—

1. In combination with a swinging gate constructed of parallel rails and vertical cleats or battens pivotally securing the said rails together, the diagonally-arranged adjusting-bars E, pivoted to the lower rail of the gate, and the horizontal locking-bar F, pivotally secured between the upper ends of the said bars E, and provided with a lug or pin, G, adapted to engage a series of apertures in the lower edge of one of the horizontal rails of the gate, substantially as specified.

2. In combination with a swinging gate consisting of horizontal rails pivotally secured together at their ends and about midway their length by means of vertical battens or cleats D, the diagonal adjusting and supporting bars E, pivotally secured to the lower rail of the gate and beveled at their ends, so as to rest snugly against the edges of the said battens D when the gate is in a horizontal position, and the locking-bar F, pivotally secured between the upper ends of the bars E and provided with a lug or pin, G, to engage the lower edge of one of the rails of the gate, substantially as specified.

In testimony whereof I affix my signature in presence of two witnesses.

GEORGE W. McLAIN.

Witnesses:
B. F. SUTHERLAND,
JOSEPH W. OSBORN.